Aug. 27, 1968 E. K. DALTON 3,399,352

PHASE DETECTOR OUTPUT SMOOTHING NETWORK

Filed March 19, 1965 2 Sheets-Sheet 1

INVENTOR.
EDWARD K. DALTON
BY White & Haefliger
ATTORNEYS.

INVENTOR.
EDWARD K. DALTON
BY White & Haefliger
ATTORNEYS.

United States Patent Office 3,399,352

Patented Aug. 27, 1968

3,399,352

PHASE DETECTOR OUTPUT SMOOTHING NETWORK

Edward K. Dalton, Riverside, Calif., assignor to Astrodata, Inc., Anaheim, Calif., a corporation of California Filed Mar. 19, 1965, Ser. No. 441,183
9 Claims. (Cl. 329—122)

ABSTRACT OF THE DISCLOSURE

The disclosed invention concerns a smoothing network in a phase locked loop FM discriminator, for smoothing the discriminator output voltage, the network including integrators operating in a predetermined sequence to integrate control current from a phase detection source.

This invention relates generally to improvements in processing of time modulated or FM signals, and more particularly concerns stabilization or smoothing of the output signals derived from frequency discriminators, particularly of the loop type.

In certain discriminator systems control current is transmitted during a time interval corresponding in magnitude to the phase difference between two signals. Such a control current may be transmitted by phase detection equipment and used to control signal generation apparatus producing a generated signal of frequency $f_v$, the latter being returned to the phase detection equipment and being driven toward phase and frequency coincidence with the data input signal. One problem that arises in such a loop is the tendency of the output signal to increase and decrease in stepwise relation rather than smoothly, i.e., sufficient input carrier or subcarrier component is present in the output as may result in undesirable distortion.

It is a major object of the present invention to effect a smoothing of the output signal by means of stabilization of the control current, the latter flowing only during the time intervals corresponding in magnitude to the phase difference between two signals such as the data input signal of frequency $f_d$ and the generated signal of frequency $f_v$. Basically, the invention involves the provision of a current flow stabilizer or smoothing network connected to respond to control current transmission for transmitting a reduced version of the control current over an extended time interval greater than the time interval of control current flow. As will appear, the integrated value of the control current over said certain time interval is proportional to, and typically is nearly equal to, the integrated value of the reduced version of the control current over the extended time interval.

Also, the control current is transmitted in discrete sequential samples during certain time intervals corresponding in magnitude to sequential samples of phase difference between two signals, and the stabilizer typically transmits the reduced version of the control current over other time intervals longer than said certain time intervals, but not exceeding the interval between cut-off of successive control current samples.

As will appear, the stabilizer typically includes a network incorporating multiple current integrators, as for example capacitors, as well as switches operable to cause the integrators alternately to integrate sequential control current samples, and so that a reduced version of the control current is transmitted from an integrator between its successive integrations of control current samples. Further, the stabilizer network may include means to momentarily ground an integrator at approximately the time of interrupted transmission thereby of the reduced version of control current; and the network may include an amplifier having its input connected in series with alternate integrators by the switches, as well as resistance connected with the amplifier at the output side thereof, the amplifier gain and said resistance having values such that the integral of a sample of control current over its flow period substantially equals the integral of the corresponding reduced version of the control current sample over its flow period, the latter period being measured between cut-off of said control current sample and the next control current sample.

These and other objects and advantages of the invention, as well as the details of illustrative embodiments, will be more fully understood from the following detailed description of the drawings in which.

Figure 1:
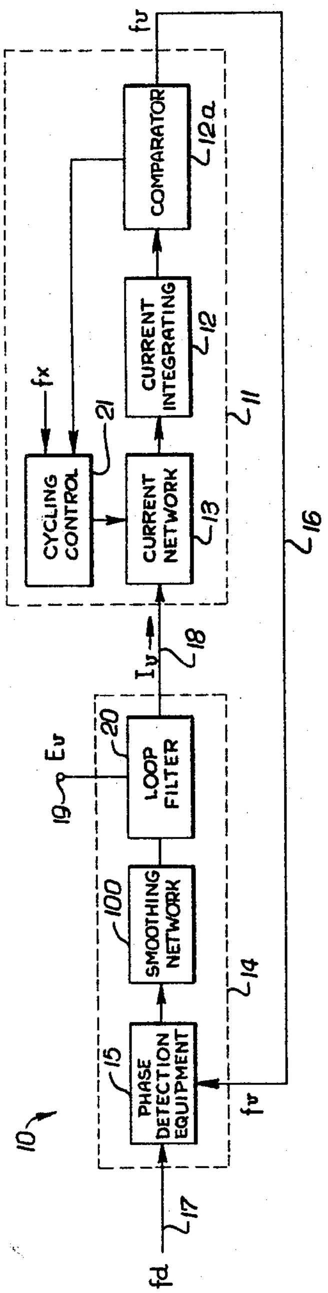
FIG. 1 is a block diagram schematically illustrating the improved discriminator described herein.

Referring first to FIG. 1, the discriminator 10 includes signal generation apparatus in the broken line block 11, and including an electrical charge storing or current integrating device 12 as well as a network 13 and control 21 for cycling the charge stored by device 12 in response to network current flow. A device such as comparator 12*a* detects such cycling in such manner that apparatus 11 generates an output signal of frequency designated $f_v$. The discriminator 10 also includes means designated by broken line block 14 to modulate the network current flow in response to detection by equipment 15 of phase difference between the data input signal of frequency $f_d$ and the generated signal of frequency $f_v$ for varying the charge cycling at 12 in a manner tending to drive $f_v$ toward $f_d$. Lead 16 designates the return path of the generated signal $f_v$ to the phase detector 15, and lead 17 indicates the input path of the data signal $f_d$ to the detector. The connection of block 14 with block 11 is indicated by the path 18 for modulating current $I_v$. The output signal $E_v$ is taken at 19 from the loop filter 20 included within block 14. The cycling control 21 modifies the current flow in network 13, as will be described.

Also included within block 14 is the current flow smoothing or stabilizing network of the present invention, and indicated by the numeral 100. As indicated, it is connected in series between the phase detection equipment 14 and the loop filter 20.

Figure 2:
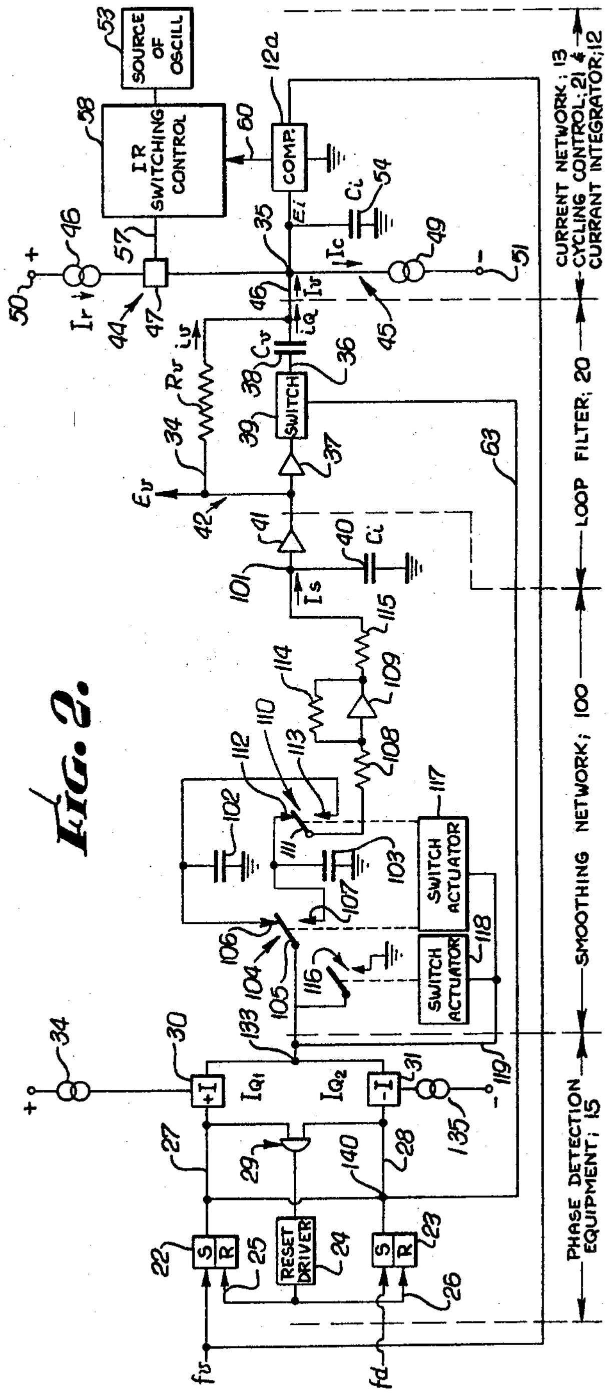
FIG. 2 is a circuit diagram of one preferred form of discriminator represented in block form in FIG. 1.

Extending the description of FIG. 2 illustrating one form of the discriminator circuit, the phase detection equipment includes phase sampling or detecting apparatus connected to repeatedly and quantitatively sample the phase difference or error between $f_v$ and $f_d$. In this regard, a typical phase difference is illustrated by waveforms A and B of FIG. 3 wherein $f_v$ initially leads $f_d$, as indicated by the quantitative time or phase difference $(t_1—t_0)$. The particular sampling apparatus seen in FIG. 2 includes flip-flops 22 and 23, which are adapted to be set by positive going axis-crossings of the signals of frequencies $f_v$ and $f_d$ respectively. In addition, a reset driver 24 has its output connected at 25 and 26 with the respective flip-flops 22 and 23, and its input connected with the flip-flop output leads 27 and 28 through an AND gate 29. Accordingly, if $f_v$ leads $f_d$, flip-flop 22 sets first at $t_0$ and flip-flop 23 then sets at $t_1$, in the FIG. 2 waveforms A and B, whereupon the flip-flops immediately reset at $t_1$.

The outputs from the flip-flops control current switches 30 and 31 respectively connected with positive and negative constant current sources or generators 34 and 135. Thus, during the successive time intervals $t_0$ to $t_1$, and $t_0'$ to $t_1'$, associated with FIG. 3, switch 31 remains off and switch 30 is turned "on" to pass network modulating current toward junction 133 and storage capacitor 40, said time intervals corresponding to the sampled phase difference. Likewise, during the successive time intervals $t_0$ to $t_1$, and $t_0'$ to $t_1'$ associated with the case where $f_d$ leads $f_v$, switch 30 is "off" and switch 31 is turned "on" to pass network modulating current away from junction 133 and capacitor 40.

The means to modulate the network current flow $I_v$ toward a summing junction 35 in network 13 may include the loop filter network 20 having parallel branches connected between the phase detector equipment 15 and the current network 13. Typically, one branch 34 is primarily resistive as indicated at the resistance $R_v$, whereby modulating current component $i_v$ may pass directly to summing junction 35 of the network 13. Connected in series in another parallel branch 36 of the filter are a buffer amplifier 37, a capacitor 38 having capacitance $C_v$ and a switching device 39. The voltage at capacitor 40 is amplified at 41 for input to the filter network. Output voltage $E_v$ constituting an amplified version of the voltage at capacitor 40 is taken from the filter at the input side 42 of branches 34 and 36.

Switching device 39, which may be incorporated in amplifier 37, is connected to delay transient current flow $i_\phi$ through capacitor 38 to the summing junction 35 during the time intervals associated with current passing operation of the current switch 31. Thus, the switching device 39 may be connected at 140 to the output lead 28 from flip-flop 23 so as to open the switch 39 when current switch 31 is turned "on," and to close switch 39 when current switch 31 is turned "off." Accordingly, transient current $i_\phi$ can flow in branch 36 to junction 35 only after current switch 31 is turned "off." On the other hand, transient current $i_\phi$ can flow to junction 35 whenever current switch 30 is turned "on." The reason for these relationships will appear from the latter discussion.

The current network 13, also described in Stanley C. Forrest et al. application for U.S. Letters Patent, Ser. No. 424,558, filed Jan. 11, 1965, includes a first unidirectional current flow leg 44 and connected to summing junction 35 to provide a charge current path, a second unidirectional current flow leg indicated at 45 and connected to junction 35 to provide a discharge current leg, and a third leg indicated at 46 to provide a path for variable current $I_v$, the latter being the sum of components $i_v$ and $i_\phi$. The latter component provides proper damping of the phase locked loops, and can be quite large in relation to the change in $i_v$ during the phase sampling interval.

Network leg 44 is shown to include an appropriate constant current generator 46 and current switch 47, and likewise leg 45 incorporates constant current generator 49, suitable positive and negative voltage sources 50 and 51 being connected to the respective legs 44 and 45. In this regard, current $I_r$ through leg 44 may be designated "charge" current, whereas current $I_c$ through leg 45 may be designated "discharge" current. The sum of the currents at junction 35 is represented by the expression $(I_v - I_c + I_r)$, or $(I_v - I_c)$, depending upon whether the $I_r$ switching control 58 is "on" or "off," as described below. Typically, $I_r$ is always larger than $I_c$, and $I_c$ is always larger than $I_v$.

The network may also be considered to include an auxiliary source of oscillations, such as is indicated at 53, such oscillations being assigned the frequency symbol, $f_x$. Examples of source 53 include a crystal controlled oscillator, or clock, as indicated, or a reference frequency on a recording which may also have an intelligence signal synchronously recorded thereon.

Figure 3:
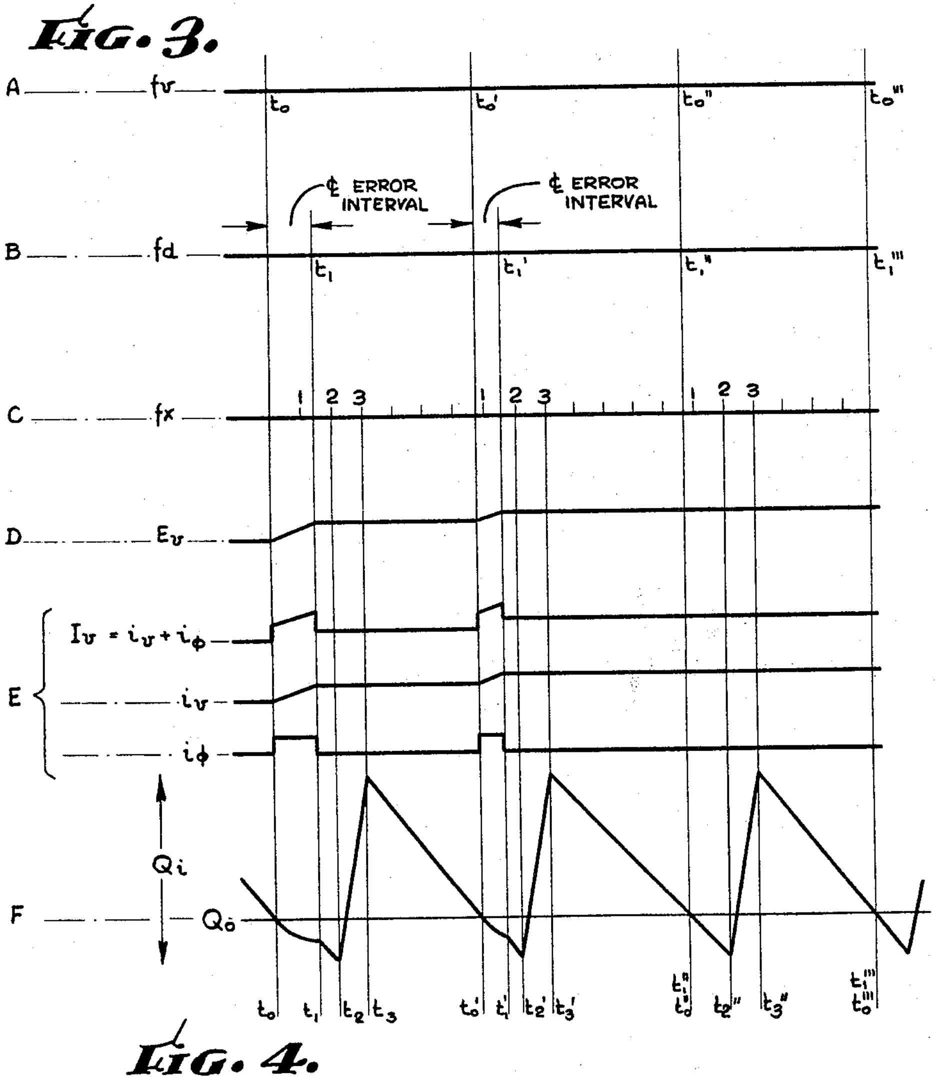
FIG. 3 is a graphical representation of one manner or mode of operation of a discriminator which does not incorporate the present invention, and in those instances where $f_v$ leads $f_d$ by less than 180°.

Further, the network may be considered to include means connected with the first leg 44 to periodically interrupt flow of current to the junction 35 in response to operation of the oscillation source 53 and comparator 12*a*, thereby to establish periodic net recharging of a charge storage means such as capacitor 54 connected to junction 35. Representative of such an interruption means is the control 58 connected at 57 to switch 47 to divert the flow of charge current $I_r$ over timewise spaced predetermined time intervals, as for example are represented in FIG. 3 by the intervals $t_3$ and $t_2'$ to $t_3'$ to $t_2''$. In this regard, those intervals may be established by the control device 58 connected in the network to allow the flow of current $I_r$ into summing junction over intervals $t_2$ to $t_3$, $t_2'$ to $t_3'$ and $t_2''$ to $t_3''$, upon repeated triggering of the control device 58 by the output signal of the comparator, in the manner now to be described. Device 58 may include standard logic circuitry to perform the functions described herein.

FIG. 3 graphically represents the operation of a discriminator which does not incorporate the present invention, when the "variable" input current $I_v$ increases in steps as indicated in waveforms E. In such a discriminator, the junction 133 will be understood as directly connected to capacitor 40 at connection point 101. Waveform A shows the spacing of the generator output pulses or axis crosings of frequency $f_v$; waveform B indicates the lagging data pulses or axis crossings of frequency $f_d$; waveform C indicates the spacing of auxiliary oscillator or source pulses of selected frequency $f_x$; waveform F depicts the time variance of the charge $Q_i$ stored on the capacitor $C_i$ designated at 54 in FIG. 2, and waveform D indicates the stepwise increasing of output voltage $E_v$.

Starting at the left end of waveform F, the capacitor 54 is discharging at a rate governed by the current $I_v - I_c$, since at this time the current $I_r$ is diverted by control 58. Between $t_0$ and $t_1$, i.e., during the phase error sampling interval, the current $I_v$ equals $(i_v + i_\phi)$ and is less than $I_c$, so that the stored charge $Q_i$ decreases, the decrease being quadratic since $i_v$ increases with time during the interval ($i_v$ increases because $E_v$ increases). Between $t_1$ and $t_0'$, $I_v$ remains constant and less than $I_c$, the increased constant value of $I_v$ being determined by $E_v$ which is proportional to the voltage at storage capacitor 40. The capacitor 54 discharges at the relatively increased rate $(I_v - I_c)$ between $t_1$ and $t_2$; it then charges at the rate $(I_v - I_c + I_r)$ between $t_2$ and $t_3$, and it discharges at the rate $(I_v - I_c)$ between $t_3$ and $t_0'$. At $t_0'$, the charge $Q_i$ has decreased to the threshold level $Q_0$ established by the corresponding voltage $E_i$ at the capacitor 54 and applied to the comparator 12*a*, thereby producing another axis crossing of a generated signal of frequency $f_v$, and seen in waveform A. That axis crossing is nearer the next axis crossing at $t_1'$ of the data signal of frequency $f_d$, with correspondingly less phase error, since the discharge of the capacitor 54 to the charge level $Q_0$ was delayed by increased input current $I_v$ during the previous interval of phase error $t_0$ to $t_1$.

The output pulse from comparator 12*a* is also applied at 60 to trigger control device 58 at $t_0$ to count clock pulses of frequency $f_x$ supplied by source 53, and indicated in waveform C. At $t_2$ corresponding to a chosen count of 2 pulses after $t_0$ for example, the device 58 is set to temporarily cease diverting the current flow $I_r$, in order to apply the charging current $I_r$ to charge the capacitor 54 for one or more clock periods.

Although in the described example the switching control 58 allows diversion of the current $I_r$ for one period of $f_x$, it is to be understood that standard or well known logic devices can be used at 68 to allow any desired number of periods of the frequency $f_x$ to be used to time the diversion of current $I_r$.

Between $t_2$ and $t_3$ corresponding to the time interval $$T=\frac{1}{f_x}$$

between the second and third pulses from source 53, the capacitor 54 is recharged at the rate $(I_v-I_c+I_r)$. At $t_3$ the next pulse from source 53 serves to reset the device 58 to resume diverting current flow $I_r$, and the capacitor 54 again discharges at a rate $(I_v-I_c)$. Accordingly, the frequency output of the generator or oscillator 11 is determined by the time interval $1/f_v$ between negative going threshold axis crossings of the charge on the capacitor 54, or the voltage $E_1$ at that capacitor, and $f_v$ can be shown to be expressed as follows:

$$f_v=\frac{I_c-\bar{I}_v}{I_r}f_x \qquad (1)$$

where $\bar{I}_v$ is the average value of the current $I_v$ over the period of the output frequency $f_v$. Accordingly, $f_v$ is desirably linearly related to $\bar{I}_v$.

It will be noted that constant current generator 49 is chosen so that $I_c$ is always greater than $I_v$. Also, $I_r$ is always greater than $I_c$ so that the output frequency $f_v$ is less than the control frequency $f_x$, to provide control for appropriate cycling of the charge on the capacitor 54 to produce the controlled output frequency $f_v$.

From $t_0'$ to $t_1'$ the capacitor 54 again discharges at the less rapid rate $(I_v-I_c)$, due to the flow of current $(i_v+i_\phi)$. In this regard, it will be noted that the phase error interval $t_0$ to $t_1$, indicating that $f_v$ is approaching $f_d$. From $t_1'$ to $t_2'$ the capacitor 54 again discharges at the relatively increased rate $(I_v-I_c)$ where $I_v$ is now constant and less than $I_c$. The capacitor 54 recharges at the rate $(I_v-I_c+I_r)$ between $t_2'$ and $t_3'$ corresponding to the second and third counts of $f_x$ after $t_1'$ seen in waveform C. The capacitor again discharges from $t_3'$ to $t_2''$. At $t_0''$ the capacitor charge has declined and passes through the comparator threshold level $Q_0$, approximately coincident with $t_1''$, showing that $f_v$ has now been driven to approximately equal $f_d$. In this regard $f_v$ will tend to follow $f_d$ with leading or lagging phase depending on the sign and rate of change of $f_d$.

Where $f_v$ lags $f_d$, switch 39 operates to delay transient current flow $i_\phi$ through capacitor 38 to the summing junction 35 during the phase error sampling intervals between $t_0$ to $t_1$, and between $t_0'$ to $t_1'$. Note in this regard the provision of connection 63 running to the switch 39 from the output side of flip-flop 23 (associated with $f_d$). This delay compensates for distortion of the output signal $E_v$ as the latter decreases, as compared with increasing $E_v$, in order that conditions of near symmetry of $E_v$ may be obtained as $E_v$ increases and decreases. In this regard, switch 39 is important since $i_\phi$ can be quite large in proportion to the change in $i_v$ during the phase sampling interval.

Referring now to the current stabilizing smoothing network 100 in FIG. 2, and with which the present invention is concerned, it basically is connected to respond to control current transmission at junction 133 for transmitting a reduced version of the control current over an extended time interval greater than that certain time interval over which control current is transmitted, and typically the integrated value of the control current over said certain time interval is proportional to the integrated value of the reduced version of control current over the extended time interval. As will appear, the stabilizer network includes multiple current integrators and switches connected to cause different integrators successively to integrate sequential control current samples in such relation that one integrator is integrating control current while a reduced version of a previously integrated sample of control current is being transmitted by another integrator.

In the form of the invention illustrated, the current integrators are represented by parallel capacitors 102 and 103, alternately connectible with junction 133 through switch 104 having arm 105 and terminals 106 and 107, so that the capacitors are caused successively to integrate control current samples transmitted from the phase detection equipment. Also, the capacitors are alternately connectible with resistor 108 at the input side of amplifier 109, through switch 110 having arm 111 and terminals 112 and 113. The amplifier output is connected with its input via resistor 114, and with capacitor 40 through resistor 115.

The switches 104 and 110 will be understood as operable, as by a suitable actuator, so that the time capacitor 102 for example is connected with junction 133 for integrating a control current sample, capacitor 103 is connected with resistor 114 for transmitting a reduced version of the control current, and vice versa. Also, another switch 116 is provided to momentarily ground whichever capacitor has been connected to resistor 108, and at approximately the time of interrupted transmission of the reduced version of control current by said capacitor. A suitable actuator for simultaneously actuating both switches 104 and 110 is seen at 117, while a suitable actuator for actuating switch 116 is provided at 118. Each of these actuators may be made to operate in response to control current transmission, through connection to junction 133 as by lead 119. The switches and actuators may be suitably mechanized according to well known principles in the art.

Figure 4:
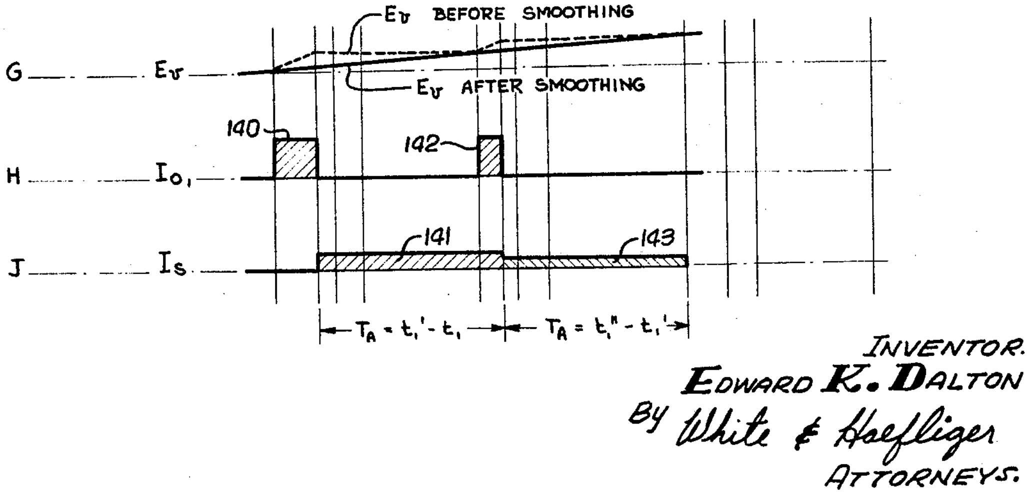
FIG. 4 is a graphical representation of the smoothing or stabilizing effect of the present invention on the output of the discriminator.

Current smoothing to best effect is realized by so proportioning the smoothing network parameters that the integral of a sample of control current $I_d$ over the interval of control current sample flow substantially equals the integral of the reduced version of the control current over the interval between cut-off of said control current sample and cut-off of the next control current sample. See in this regard waveform H in FIG. 4 wherein a sample 140 of control current flowing during the phase error sampling interval between $t_0$ and $t_1$ charges capacitor 102; and from $t_1$ to $t_1'$ capacitor 102 discharges, a reduced version 141 of the control current sample flowing from the network 100 to capacitor 40 as seen in waveform J. Also in that figure, the sample 142 of control current flowing during the phase error interval $t_0'$ to $t_1'$ charges capacitor 103; and from $t_1'$ to $t_1''$ capacitor 103 discharges, a reduced version 143 of the control current sample flowing from the network 100 to capacitor 40. In this regard, the area sample 140 equals the area block 141, and the area of sample 142 equals the area of block 143. Further, the switches 104 and 110 are operated at times $t_1$ and $t_1'$. Also, switch 116 is closed at times $t_1$ and $t_1'$, and is opened at times $t_0$ and $t_0'$. These relationships may be further defined by the following expression:

$$A=\frac{RC}{T_A} \qquad (2)$$

where:

$A$=gain of amplifier 109
$R$=value of resistance 115
$C$=capacitance of each capacitor 102 and 103
$T_A$=the interval betwen cut-off of successive control current samples FIG. 4 also graphically shows the smoothing effect on the discriminator output voltage $E_v$ indicated in solid lines in waveform G. The broken lines in waveform G indicates $E_v$ according to waveform D, and increasing by steps rather than smoothly as in the solid line.

Among the unusual advantages of the discriminator, enhanced by the smoothing network 100, are the following: the clock source 53 and control 58 effecting switching of $I_r$ operate independently of the phase detection equipment 15, the control 58 being triggered when the camparator 12a detects a threshold crossing to produce pulses of frequency $f_v$; the operation of the comparator is unaffected by the timng of application of the charging current $I_r$ to the summing junction so long as it is applied during a short interval within the cycling period of the signal $f_v$; i.e., the phase of $f_v$ is independent of the phase of $f_x$; the phase detector may be characterized as having no second harmonic signal output at phase balance; phase lock may be achieved within two cycles of the intelligence signal of frequency $f_d$ with proper choice of parameters; and $f_v$ can lead or lag $f_d$ by up to 180 degrees and phase lock can still be rapidly achieved. In particular, the amount of carrier riding on the signal $E_v$ is substantially eliminated, through provision of the present invention.

In the foregoing description, functional block elements 22, 23, 24, 29, 30, 31, 34, 35, 37, 39, 41, 46, 47, 49, 53, 58 and **12*a*** may be constructed according to well known principles in the art.

I claim:

1. In a phase locked loop system wherein control current is transmitted from a source during a certain time interval corresponding in magnitude to the phase difference between two signals, a current flow stabilizer responsive to said control current transmission for transmitting a reduced version of said control current over an extended time interval greater than said certain time interval, the integrated value of said control current over said certain time interval being proportional to the integrated value of said reduced version of said control current over said extended time interval, said stabilizer including multiple capacitors sequentially electrically connectible with said source to sequentially store said control current.

2. In a phase locked loop system wherein control current is transmitted from a source in sequential samples during certain time intervals corresponding in magnitude to sequential samples of phase difference between two signals, a current flow stabilizer responsive to said control current transmission for transmitting a reduced version of said control current over an extended time interval greater than said certain time interval, the integrated value of said control current over said certain time interval being proportional to the integrated value of said reduced version of said control current over said extended time interval, said stabilizer including a network having multiple current integrators and switches connected in the network with different integrators operating in predetermined sequence to integrate sequential control current samples irrespective of the polarity thereof and to transmit said reduced versions of control current and characterized in that one integrator is integrating control current while a reduced version of a previously integrated sample of control current is being transmitted by another integrator.

3. The system of claim 2 in which the stabilizer includes switch actuator means connected to said switches and responsive to control current transmission repeatedly to switch said integrators in and out of electrical connection with said source.

4. The system of claim 3 in which the stabilizer includes means to momentarily ground an integrator at approximately the time of interrupted transmission thereby of said reduced version of the control current.

5. In a phase locked loop system wherein control current is transmitted from a source in sequential samples during a certain time interval corresponding in magnitude to sequential samples of phase difference between two signals, a current flow stabilizer responsive to said control current transmission for transmitting a reduced version of said control current over an extended time interval greater than said certain time interval, the integrated value of said control current over said certain time interval being proportional to the integrated value of said reduced value of said control current over said extended time interval, said stabilizer including a network having multiple current integrators and switches connected in the network with different integrators operating in predetermined sequence to integrate sequential control current samples and to transmit said reduced versions of control current and characterized in that one integrator is integrating control current while a reduced version of a previously integrated sample of control current is being transmitted by another integrator, said network including an amplifier having its input connected in series with alternate integrators by said switches, and a resistance connected in series with the amplifier at the output side thereof, the amplifier gain and said resistance having values such that the integral of a sample of control current over the interval of control current sample flow substantially equals the integral of the corresponding reduced version of the control current over the interval between cut-off of said control current sample and cut-off of the next control current sample.

6. The system of claim 5 wherein said integrators comprise capacitors, and wherein the gain A of said amplifier approximates the value of the expression:

$$\frac{RC}{T_A}$$

where:

R=the value of said resistance

C=the value of each integrator capacitance $T_A$=the interval between cut off of successive control current samples.

7. In a system for deriving an amplitude modulated output signal from a time modulated data input signal of frequency $f_d$, a signal generator to produce a generated signal of frequency $f_v$, and means including phase detection equipment to control the signal generator in response to detection of phase difference between the data input signal and the generated signal and tending to drive $f_v$ toward $f_d$, the phase detection equipment including apparatus to transmit control current from a source during a certain time interval corresponding to sequential samples of said detected phase difference, and said means including a current flow stabilizer responsive to said control current transmission for transmitting a reduced version of said control current over another time interval greater than said certain time interval, said stabilizer including multiple current integrators sequentially electrically connectible to said source to sequentially integrate said control current in samples corresponding to said samples of detected phase difference.

8. In a system for deriving an amplitude modulated output signal from a time modulated data input signal of frequency $f_d$, signal generation apparatus including an electrical charge storing device and a first network for cycling the charge stored by said device in response to network current flow thereby to produce a generated signal of frequency $f_v$, and means including phase detection equipment to modulate said network current flow in response to detection of phase difference between said data input signal and said generated signal for varying said charge cycling and tending to drive $f_v$ toward $f_d$, said phase detection equipment including phase sampling apparatus connected to repeatedly and quantitatively sample said phase difference, said phase detection equipment including current switching apparatus connected to transmit control current from a source during a certain time interval corresponding in magnitude to a quantitative sample of said phase difference in response to operation of said sampling apparatus, and said means to modulate said network current flow including a current flow stabilizer responsive to said control current transmission for transmitting a reduced version of said control current over another time interval greater than said certain time interval, said stabilizer including multiple current integrators sequentially electrically connectible to said source to sequentially integrate said control current in samples corresponding to said samples of detected phase difference.

9. The system of claim 7 wherein the stabilizer includes switch means controlling the connection of said integrators with said source and in synchronism with one of said signals of frequency $f_d$ and $f_v$.

References Cited

UNITED STATES PATENTS

| | | | |
|---|---|---|---|
| 2,557,319 | 6/1951 | Smith | 332—1 X |
| 2,994,822 | 8/1961 | Isley | 329—106 X |
| 3,125,691 | 3/1964 | Astheimer | 307—88.5 |
| 3,152,267 | 10/1964 | Clapper | 328—58 X |
| 3,158,837 | 11/1964 | Bodin et al. | 328—111 X |
| 3,274,514 | 9/1966 | Foulger | 328—58 |
| 3,317,756 | 5/1967 | La Porte | 307—88.5 |

ALFRED L. BRODY, *Primary Examiner.*